MICROWAVE POWER GENERATOR USING LSA MODE OSCILLATIONS

Filed Feb. 6, 1968 2 Sheets-Sheet 1

*INVENTORS.*
LESTER F. EASTMAN
WILBERT K. KENNEDY, JR.
*BY*
ATTORNEYS

Dec. 30, 1969 L. F. EASTMAN ET AL 3,487,334

MICROWAVE POWER GENERATOR USING LSA MODE OSCILLATIONS

Filed Feb. 6, 1968 2 Sheets-Sheet 2

INVENTORS.
LESTER F. EASTMAN
WILBERT K. KENNEDY, JR.
BY
ATTORNEYS

United States Patent Office 3,487,334
Patented Dec. 30, 1969

3,487,334
MICROWAVE POWER GENERATOR USING LSA MODE OSCILLATIONS

Lester F. Eastman and Wilbert K. Kennedy, Jr., Ithaca, N.Y., assignors to Research Corporation, New York, N.Y., a nonprofit corporation of New York
Filed Feb. 6, 1968, Ser. No. 703,415
Int. Cl. H03b 7/06, 7/14
U.S. Cl. 331—107 16 Claims

ABSTRACT OF THE DISCLOSURE

A semiconductor exhibiting bulk negative resistivity is mounted in a microwave resonant circuit. A bias voltage substantially above the Gunn threshold is applied in a direction parallel to the electric field in the resonant circuit to produce LSA mode oscillations. A dimension of the semiconductor perpendicular to the electric field does not exceed about twice the skin depth at the operating frequency. At least one, and preferably both, dimensions orthogonal to the first dimension substantially exceed twice the skin depth and may approach half a wavelength, thereby enabling large semiconductor bodies to be employed and large amounts of power to be generated. Waveguide and plane-wave resonant circuit arrangements are specifically described. A plurality of semiconductor slabs may be stacked.

BACKGROUND OF THE INVENTION

The invention described herein was made in the course of performing Air Force Contract AF30(602)-3987.

Semiconductor diodes exhibiting negative resistivity have been found capable of generating power at microwave frequencies. One type of generator employs the so-called "Gunn effect." Briefly, for some semiconductor materials, if a voltage is applied to opposite faces of a block of the material, the current increases with voltage at low voltages in ohmic fashion, with the electric field and conduction current density uniform throughout the block. Assuming an n-type material in which the current is carried by free electrons, the drift velocity of the electrons is proportional to the electric field. However, after a certain threshold voltage is reached this is no longer true. Above the threshold the electron drift velocity begins to decrease as the electric field increases, and the material exhibits negative resistivity.

It has been found experimentally by Gunn that space charge layers form in the semiconductor at voltages above the threshold, resulting in a high field domain which drifts from one terminal to the other at the carrier drift velocity. This effect has been used in a transit-time oscillator. The frequency of Gunn effect transit-time oscillators is a function of the thickness of the semiconductor and the drift velocity therein. Thus, with the semiconductor inserted in a resonant circuit, the frequency is determined largely by the transit-time period and the resonant circuit is tuned accordingly. For higher operating frequencies, thinner semiconductors are required, thus limiting the power that can be generated.

A different type of operation of negative resistance semiconductor diodes has been described (Copeland, Proc. IEEE (Letters), vol. 54, pp. 1479–1480, October 1966) in which the doping of the semiconductor, the bias voltage, the operating frequency and the resonant circuit loading are selected to avoid the building up of domains and other types of space charge which produce the transit-time operation, and utilizes the bulk negative resistance of the semiconductor to produce oscillations. This type of operation has been termed the LSA (Limited Space-charge Accumulation) mode, and in general involves a voltage swing at the operating frequency such that the time the voltage is above threshold is too short for space charge to build up and form a domain, and the time it is below threshold is sufficient to dissipate any weak accumulation of space charge during the remainder of the cycle. The time necessary to accomplish space-charge growth and dissipation varies inversely with the doping or carrier density, and hence the doping is selected for the desired operating frequency. Also, the circuit loading is selected to achieve the necessary AC voltage swing. A pulsed bias voltage is commonly required which is more than twice the threshold voltage for Gunn oscillations.

With LSA operation, frequencies higher than the reciprocal of the transit time are obtainable, hence higher than Gunn oscillations, and more power at a given frequency can be produced, especially without resorting to very low, impractical, sample impedance.

At the present time n-type gallium arsenide (GaAs) is the more commonly used semiconductor exhibiting bulk negative resistivity, although other semiconductors such as indium phosphide (InP) and cadmium telluride (CdTe) are known to exhibit the effect, and further semiconductor materials may be found which exhibit the effect.

The present invention is directed to devices employing the LSA type of operation in which the semiconductor geometry and the mounting of the semiconductor in a resonant circuit are selected to permit relatively large blocks of semiconductor to be employed effectively, with consequent increase in power output.

SUMMARY OF THE INVENTION

For effective LSA mode operation, it is important for the electric field of the resonator to penetrate the semiconductor so that the formation of domains which would impair or destroy the LSA operation are avoided throughout the semiconductor. Also it is desirable that the microwave field within the semiconductor be fairly uniform, uniformity within 10% being found desirable. The skin depth of the semiconductor is a measure of the depth of penetration. If all dimensions of the semiconductor were less than the skin depth, satisfactory penetration could be obtained. However, this seriously limits the amount of power which can be produced.

The present invention provides an LSA mode oscillator in which only one dimension of the semiconductor need be limited by skin depth considerations, and the other two dimensions can be increased substantially, approaching a half-wavelength or more at the operating frequency.

In accordance with the invention, a body of semiconductor material exhibiting bulk negative resistivity is mounted in a microwave resonant circuit and a biasing voltage is applied thereto in a direction parallel to the uniform electric field in the resonant circuit. The dimension of the semiconductor body in one direction perpendicular to the electric field is predetermined not to exceed about twice the skin depth. At least one, and preferably both, of the dimensions orthogonal to the dimension limited by skin depth considerations are selected to substantially exceed twice the skin depth. In this manner a relatively large body of semiconductor material can be employed, while insuring adequate penetration of the uniform electric field, and thus large amounts of power at microwave frequencies can be generated.

Preferably, the semiconductor is a slab having opposed faces substantially parallel to the electric field in the resonant circuit, with the linear dimensions of the faces substantially exceeding twice the skin depth at the operating frequency, and the thickness of the slab between said faces not exceeding about twice the skin depth.

In a preferred embodiment the semiconductor slab is mounted in a resonant waveguide cavity of rectangular cross-section with opposed faces extending longitudinally of the waveguide and perpendicular to the upper and lower waveguide walls. The dimension of the slab perpendicular to said faces is predetermined not to exceed about twice the skin depth, whereas at least one, and preferably both, the dimensions of the faces substantially exceed twice the skin depth. With this configuration the longitudinal and vertical dimensions of the faces may approach a half-wavelength, say $\lambda/\pi$ where $\lambda$ is the free space wavelength, thereby providing a large body of semiconductor material capable of generating high power at microwave frequencies.

In another embodiment using a plane-wave resonant circuit, still larger face dimensions (in terms of wavelength) may be employed with suitable care in designing and constructing the resonator.

In accordance with a further feature of the invention, a plurality of semiconductor slabs are employed, preferably stacked in the direction of the electric field in the resonant circuit, thereby enabling a plurality of smaller semiconductor slabs to be employed in lieu of one larger slab, while yielding high output power, and also permitting smaller bias voltages to be employed.

DESCRIPTION OF THE SPECIFIC EMBODIMENTS

Figure 1:
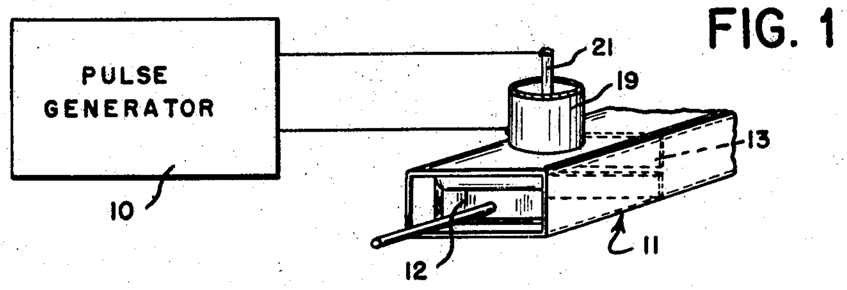
FIG. 1 shows a preferred embodiment of the invention using a waveguide resonator.
Figure 2:
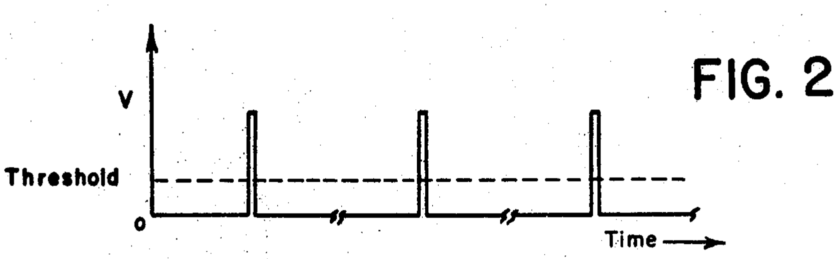
FIG. 2 shows the applied bias pulses.

FIG. 1 shows a pulse source 10 connected to supply bias pulses to the waveguide or rectangular resonator 11. A coaxial bias line may be employed, as indicated by the coaxial section 19, 21 mounted on the waveguide. The pulses are shown in FIG. 2.

Several considerations are involved in the selection of peak voltage, pulse width and pulse repetition rate. The peak voltage should be sufficiently high to produce LSA operation, and in general is two or more times the Gunn threshold voltage. With n-type GaAs, the threshold is about 3700 volts per centimeter in presently available material, and voltages in excess of 7500 v./cm. are desirable. For a given doping and operating frequency, it has been observed that as the applied voltage is increased above the threshold, the output power increases to a maximum and then decreases. In one sample having a doping concentration of $3.3\times10^{14}$ electrons/cm.$^3$, the maximum power output occurred at 4 to 5 times the threshold voltage. Further, it has been observed that the higher the doping concentration, the higher the voltage yielding maximum output power.

Rapid rise times are also important, so that the applied voltage passes rapidly above the threshold to the region yielding LSA operation, and minimizes the time during which Gunn oscillations could start. In one embodiment using 0.10-microsecond pulses, the voltage rose from the Gunn domain threshold of about 3700 v./cm. to the LSA threshold of 7500 v./cm. in a time equivalent to about two cycles of LSA oscillation, or about 0.25 nanosecond ($10^{-9}$ sec.) for 8.0 gHz. ($10^{-9}$ cycles per second) oscillations. This was obtained by using a mercury wetted reed switch actuated at 60 Hz.

The length of the pulses should be selected so as not to produce an excessive temperature rise during the course of a pulse, and the pulse repetition rate selected so as not to produce an excessive average temperature rise.

The doping concentration may be selected in view of the desired frequency of operation. In general it is found that, for n-type GaAs, the ratio $N_0/f$ should lie between $10^4$ and $2\times10^5$, where $N_0$ is the doping concentration in electrons/cm.$^3$ and $f$ is the frequency. At the present time an optimum $N_0/f$ is found to be about $5\times10^4$. An upper limit on frequency is believed to be imposed by the intervalley scattering time, say about $5\times10^{11}$ cycles/second for GaAs.

Figure 3:
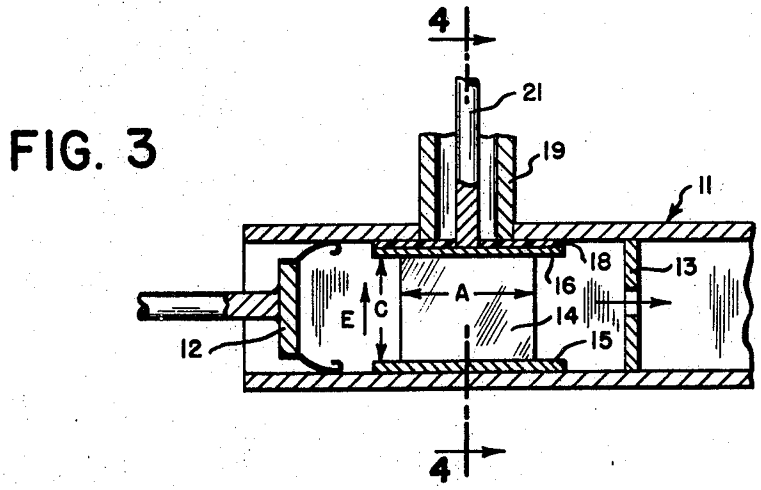
FIG. 3 is a vertical longitudinal section of the waveguide resonator of FIG. 1.
Figure 4:
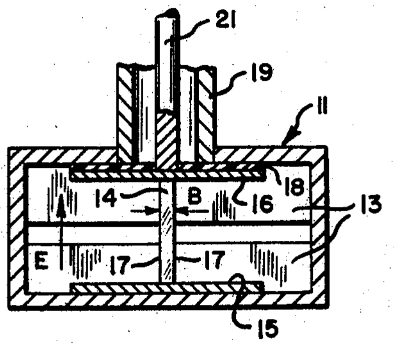
FIG. 4 is a cross-section taken along the line 4—4 of FIG. 3.

FIGS. 3 and 4 show the configuration for using a slab of GaAs in a waveguide or rectangular resonator. The resonator shown is formed of a section of waveguide 11 having a rectangular cross-section as shown in FIG. 4. One end of the section is closed by a tuning plunger 12 and the other end is provided with an iris diaphragm 13 allowing the extraction of power. A semiconductor slab 14, provided with conductive films connected to metal sheets 15, 16, is mounted in the resonator with its opposed faces 17 parallel to the electric field shown by arrows E. The dimensions of the faces are designated A and C. The faces 17 extend longitudinally of the waveguide and are perpendicular to the upper and lower walls thereof. The thickness of the slab, designated B, is perpendicular to the electric field E. As will be understood, dimensions A, B and C are orthogonal to each other. Metal sheet 15 contacts the waveguide wall, whereas metal sheet 16 is insulated from the wall by a dielectric sheet 18. A coaxial line section has its outer conductor 19 attached to the waveguide wall, and its center conductor 21 attached to metal sheet 16. Bias pulses from the generator 10 (FIG. 1) are applied to the coaxial line section and produce a bias voltage across the semiconductor slab in the same direction as the electric field E. Either positive or negative pulses may be applied to inner conductor 21, as desired.

In this embodiment the height C of the semiconductor is advantageously substantially the full height of the waveguide or rectangular cavity to insure uniform microwave electric fields in the GaAs slab, and, depending on the resonator design, may approach a free-space half wavelength at the operating frequency, say $\lambda/\pi$. The width A may also approach a half-wavelength at the operating freqeuncy, say $\lambda/\pi$. The wavelength in the waveguide is usually considerably greater than in free space, and in general the width A may approach one-quarter of the guide wavelength. It is thus seen that the area of the face of the semiconductor slab may be a reasonable fraction of the waveguide cross-section. For satisfactory operation, the thickness B of the slab should not exceed about twice the skin depth of the semiconductor material used. The skin depth may be expressed as:

$$\text{Skin depth}=\left(\frac{2}{\omega\mu_0\delta}\right)^{1/2} \quad (1)$$

where $\omega=2\pi f$
$f$=operating frequency
$\mu_0$=permeability of free space
$\delta$=conductivity of the semiconductor
$=N_0\mu_n e$
$e$=electron charge
$N_0$=doping concentration (electrons/cm.$^3$)
$\mu_n$=mobility of the electrons in cm.$^2$ per volt-second.

As the waves are reflected from the ends and walls of the cavity, they impinge on and penetrate the semiconductor. With these dimensional limits, the field within the semiconductor is fairly uniform and the formation of Gunn domains is avoided throughout the semiconductor.

As is seen from Equation 1, thicker slabs can be employed for lower frequencies, and for lower doping concentrations.

The impedance of the semiconductor slab 14 and the output impedance of pulse generator 10 should usually match, for power efficiency. At and below the Gunn threshold the DC resistance of the slab will depend on its dimensions and conductivity. Above the threshold, however, the current remains approximately constant. Thus a slab having a resistance of 12.5 ohms at the threshold will have an effective impedance of about 50 ohms with a bias voltage four times the threshold. This is suitable for 50-ohm coaxial line and pulse generators.

The shape, size and positioning of the iris in plate 13 may be selected to yield the proper RF loading. This should permit the voltage swing required for LSA operation, as described above. In one specific embodiment, a 150-ohm impedance was found satisfactory, this being about twelve times the DC impedance of the semiconductor slab (at and below the threshold).

Although positioning the slab centrally in the waveguide as shown in FIG. 4 has been used with success, in some instances an off-center location may be desirable for impedance matching.

The design of waveguide resonators per se is well known in the art, and further explanation is unnecessary. Various means can be used to extract power, while preserving proper loading, in place of the iris and iris position shown.

With slabs approaching the limiting dimensions given above, high power pulses of high voltage are required. Smaller slabs and lower power pulse generators can also be used. In such case the metal sheets 15, 16 may be replaced by posts between which the slab is held, due care being exercised to insure that uniform microwave electric fields are present in the semiconductor slab.

Figures 5, 6, 7, 8, 9:
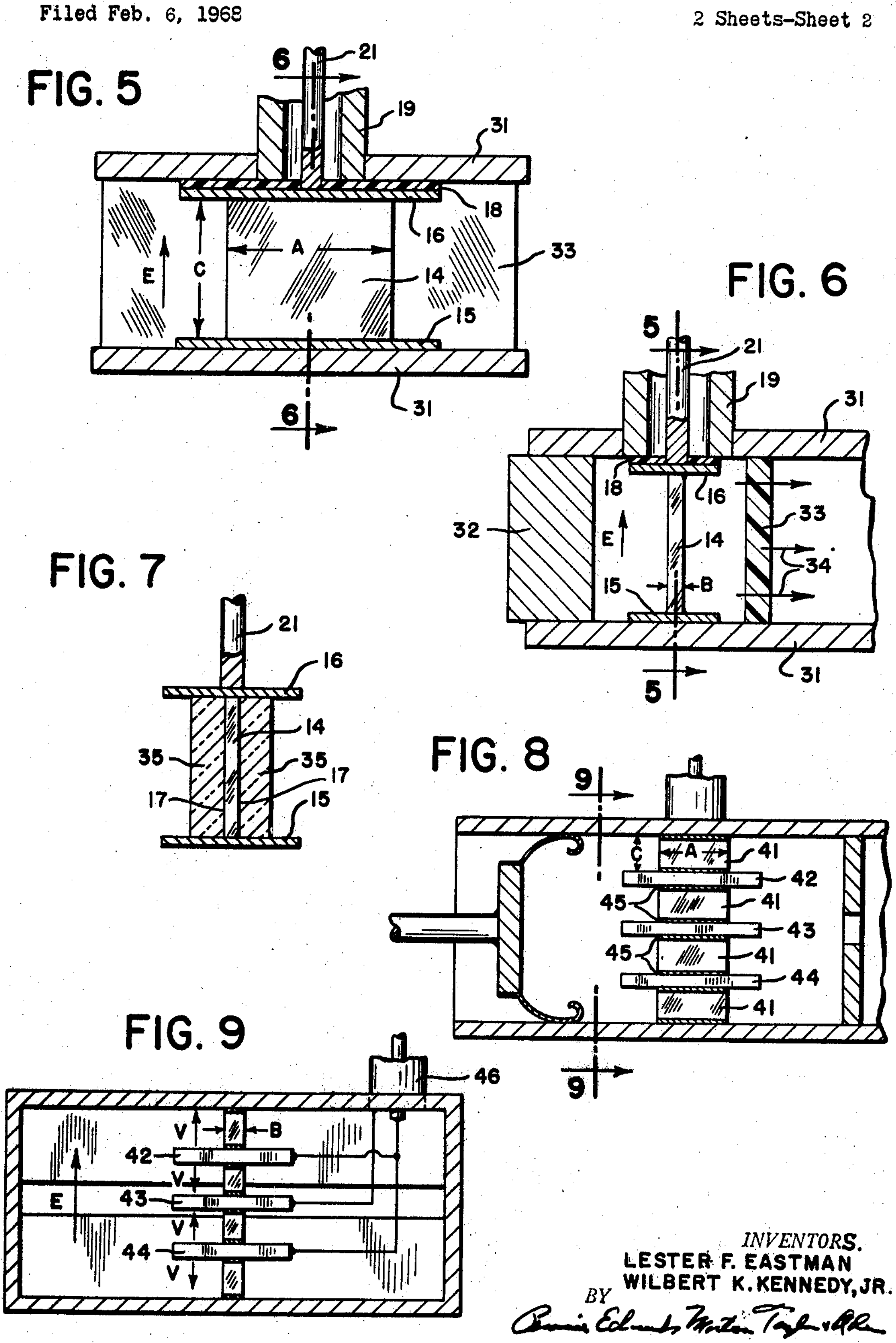
FIGS. 5 and 6 are sectional views illustrating another embodiment of the invention utilizing a plane-wave resonator, FIG. 5 being taken along line 5—5 of FIG. 6, and FIG. 6 along line 6—6 of FIG. 5.
FIG. 7 illustrates the use of heat conducting slabs to promote heat dissipation from the semiconductor slab.
FIGS. 8 and 9 illustrate a modification similar to FIGS. 3 and 4 but using a plurality of smaller semiconductor slabs in place of one large slab.

FIGS. 5 and 6 show an embodiment using a plane-wave resonator. The resonator is of known construction and has parallel upper and lower conductive plates 31, and spaced parallel end walls formed by a conductive tuning block 32 and a dielectric slab 33. A portion of the generated microwaves pass through the dielectric slab, as indicated by arrows 34. The semiconductor slab is structurally mounted in the resonator as in FIGS. 3 and 4, and the same numerals are used.

The orientation of the semiconductor slab 14 is such that its opposed faces are perpendicular to the upper and lower plates and parallel to the end walls, hence being parallel to the electric field E. The thickness B, perpendicular to the faces, should not exceed about twice the skin depth. However, the face dimensions A and C can be increased beyond a half-wavelength if the necessary care is taken in the resonator design to prevent unwanted modes of oscillation. These precautions may follow known practices in the art.

Referring to FIG. 7, one limiting factor on the amount of power that can be generated is temperature rise in the semiconductor. To improve heat dissipation, slabs 35 of material of suitable dielectirc properties at microwave frequencies and having higher heat conductivity than GaAs may be placed on either side of the semiconductor 14, in close contact with the faces of the semiconductor and the metal sheets 15, 16. Surface 15 is in contact with the wall of the waveguide in FIG. 4, or with the lower plate 31 in FIG. 6, which accordingly function as heat sinks for slabs 35. One suitable material is sapphire, which has a much higher heat conductivity than GaAs. Removing the heat at surfaces 17 of the GaAs slab has the distinct advantage that temperature gradients are confined mainly to the direction perpendicular to the electric field. This allows a more uniform temperature in the direction of electric field and more uniform electric properties in the slab in the electric field direction, and thus better LSA performance.

To take full advantage of the configuration of the invention, large slabs of high quality semiconductor material capable of withstanding the high fields involved are required. If only small slabs are available, the embodiment of FIGS. 8 and 9 will permit obtaining higher power than those of the preceding embodiments. Even if available, the embodiment of FIGS. 8 and 9 may be preferred for some applications, since lower pulse voltages can be employed.

As shown, a plurality of semiconductor slabs 41 are stacked one on top of the other, with intervening conductive metal sheets 42, 43, 44. Each slab 41 has conductive films 45 on upper and lower edges, making good contact with the adjacent metal sheets 42–44. The waveguide cavity arrangement of FIGS. 3, 4 is specifically shown, and need not be described again. The stacked arrangement could also be used with a plane-wave resonator as in FIGS. 5, 6.

The biasing voltage pulses are applied to pairs of conductive metal sheets 42, 43, 44, and therefore are effective across the intervening semiconductor slab. The voltage across the slabs may have either polarity. Accordingly sheets 42 and 44 are connected together and to the center conductor of coaxial line 46, and sheet 43 is connected to the outer coaxial conductor, thereby energizing the slabs in parallel. The center coaxial conductor may be either positive or negative. If positive, the directions of the bias voltages across the semiconductor slabs will be as shown by the arrows V. Although the polarity reverses from slab to slab, the direction of the bias voltages is parallel to the microwave electric field E, as in FIGS. 3–4. With an even number of semiconductor slabs, as shown, both top and bottom slabs may be connected to the waveguide wall. If an odd number were employed, an insulating layer could be used as at 18 in FIGS. 3–4.

For the same overall height, a given v./cm. can be produced with a lower pulse bias voltage in FIG. 9 than in FIG. 4. With dimensions A and B the same as in FIG. 4, and the sum of dimensions C of slabs 41 approximately equal to C of slab 14, similar amounts of power may be generated. If desired, more than one stack could be employed.

Although waveguide cavity (or equivalent rectangular cavity) and plane-wave resonant circuits are used in the above specific embodiments, other types of microwave resonant circuits may be employed if desired as long as uniform microwave electric fields result at and in the semiconductor slab.

We claim:

1. A microwave generator which comprises:

(a) a microwave resonant circuit including means for extracting power therefrom, (b) a body of semiconductor material mounted in said resonant circuit and exhibiting bulk negative resistivity at bias voltages substantially above the Gunn threshold, (c) and biasing means for applying a bias voltage across said body of semiconductive material in a direction substantially parallel to the microwave electric field in said resonant circuit, (d) one dimension of said semiconductor body in a direction perpendicular to said electric field not exceeding about twice the skin depth at the operating frequency, (e) at least one of the dimensions of the semiconductor body orthogonal to the first-mentioned dimension substantially exceeding twice the skin depth at the operating frequency, (f) said bias voltage and the loading of said resonant circuit being predetermined to produce LSA mode oscillations.

2. A microwave generator in accordance with claim 1 in which both dimensions of said semiconductor body orthogonal to said first-mentioned dimension substantially exceed twice the skin depth at the operating frequency.

3. A microwave generator in accordance with claim 1 in which said body of semiconductor material is a slab mounted in said resonant circuit with opposed faces of the slab substantially parallel to the microwave electric field.

4. A microwave generator in accordance with claim 3 in which the linear dimensions of said faces substantially exceed twice the skin depth at the operating frequency and the thickness of the slab between said faces does not exceed about twice said skin depth.

5. A microwave generator in accordance with claim 1 in which said resonant circuit is a waveguide cavity of rectangular cross section, said body of semiconductor material is a slab mounted in the waveguide with opposed faces thereof extending longitudinally of said waveguide and being perpendicular to the upper and lower walls thereof, at least one of the longitudinal and vertical dimensions of said faces substantially exceeding twice the skin depth at the operating frequency and the dimension perpendicular to said faces not exceeding about twice said skin depth.

6. A microwave generator in accordance with claim 5 in which both said longitudinal and vertical dimensions substantially exceed twice said skin depth.

7. A microwave generator in accordance with claim 6 in which said longitudinal and vertical dimensions are less than about $\lambda/\pi$ where $\lambda$ is the free space wavelength at the operating frequency.

8. A microwave generator in accordance with claim 5 including a plurality of said slabs of semiconductor material stacked in the direction of said electric field, and conductive sheets between adjacent semiconductor slabs and at the outer ends of the stack, alternate conductive sheets being connected together, said biasing means applying the bias voltage between alternate conductive sheets and intervening sheets in parallel.

9. A microwave generator in accordance with claim 3 including a plurality of said slabs of semiconductor material mounted in said resonant circuit with opposed faces of each slab substantially parallel to the electric field therein, said biasing means applying said bias voltage across each slab in a direction substantially parallel to said electric field.

10. A microwave generator in accordance with claim 9 in which said plurality of slabs are stacked in the direction of said electric field, and including conductive metal sheets between adjacent semiconductor slabs and at the outer ends of the stack, alternate conductive sheets being connected together, said biasing means applying the bias voltage between alternate conductive sheets and intervening sheets in parallel.

11. A microwave generator in accordance with claim 1 in which said resonant circuit is a plane-wave structure having parallel upper and lower conductive plates and spaced parallel end walls, said body of semiconductor material is a slab mounted in the plane-wave structure with opposed faces thereof perpendicular to said upper and lower plates and parallel to said end walls, at least one of the vertical and lateral dimensions of said faces substantially exceeding twice the skin depth at the operating frequency and the dimension perpendicular to said faces not exceeding about twice said skin depth.

12. A microwave generator in accordance with claim 11 in which both the vertical and lateral dimensions of said faces substantially exceed twice said skin depth.

13. A microwave generator in accordance with claim 12 including a plurality of said slabs of semiconductor material stacked in the direction of said electric field, and conductive sheets between adjacent semiconductor slabs and at the outer ends of the stack, alternate conductive sheets being connected together, said biasing means applying the bias voltage between alternate conductive sheets and intervening sheets in parallel.

14. A microwave generator in accordance with claim 3 including heat sink slabs of dielectric material having a higher heat conductivity than said semiconductor slab respectively in contact with said opposed faces of the semiconductor slab substantially parallel to the microwave electric field, whereby temperature gradients are reduced in the direction of the microwave electric field and are confined primarily to a direction perpendicular to the microwave electric field.

15. A microwave generator which comprises:

(a) a microwave resonant circuit including means for extracting power therefrom, (b) a plurality of bodies of semiconductor material exhibiting bulk negative resistivity at bias voltages substantially above the Gunn threshold, (c) said plurality of bodies being mounted in said resonant circuit and stacked in the direction of the microwave electric field therein, (d) conductive sheets between adjacent semiconductor bodies and at the outer ends of the stack, (e) and biasing means for applying bias voltage across each of said bodies of semiconductor material in a direction substantially parallel to said microwave electric field, (f) one dimension of each of said semiconductor bodies in a direction perpendicular to said electric field not exceeding about twice the skin depth at the operating frequency, (g) said bias voltages and the loading of said resonant circuit being predetermined to produce LSA mode oscillations.

16. A microwave generator in accordance with claim 15 in which alternate conductive sheets are connected together and said biasing means is connected to apply said bias voltage between alternate conductive sheets and intervening sheets in parallel.

References Cited

Copeland: "CW Operation of LSA Oscillator Diodes—44 to 88GHz," The Bell System Technical Journal, January 1967, pp. 284–287.

Copeland: "GaAs Bulk Oscillators Stir Millimeter Waves," Electronics, June 12, 1967, pp. 91–96.

Copeland: "LSA Oscillator-Diode Theory," Journal of Applied Physics, July 1967, pp. 3096–3101.

ROY LAKE, Primary Examiner

S. H. GRIMM, Assistant Examiner

U.S. Cl. X.R.

317—234